Patented Apr. 24, 1951

2,550,324

UNITED STATES PATENT OFFICE 2,550,324

PROCESS FOR CONTROLLING WEATHER

Harvey M. Brandau, Wilton, Wis., assignor to W. C., Inc., a corporation of Delaware No Drawing. Application May 7, 1948,
Serial No. 25,807

6 Claims. (Cl. 299—28)

This invention relates to a process for effecting changes in weather conditions and more specifically to a process for dissipating clouds and fog by clearing the atmosphere of moisture particles that are large enough to be visible and yet not large enough to fall out of suspension in the gases of the atmosphere. The overall object of the present invention is directed to the control of weather conditions generally.

Specifically, an object of this invention is to maintain contact weather conditions at airports, air traffic zones and centers and on airways by reducing economically the amount of visible water vapor causing the particular undesirable weather.

Another object of this invention is to control weather which causes hail damage, lightning and interferences with wave transmissions by the reduction of visible water vapor through the dissipation of cumulonimbus clouds.

Another object of this invention is the control of weather by dissipating typhoons, hurricanes, and other storm centers by the dissipation of the convective clouds forming the weather phenomena.

Another object of the present invention is the control of weather causing snow and sleet in heavily populated areas where large quantities are particularly undesirable because of its effect on traffic conditions.

Another object of the present invention is the process of dissipating weather frontal systems which cause floods due to continuous rains.

Another object of the present invention is to provide rain in designated areas by use of my weather control processes.

Another object of the present invention is to provide desirable weather for sport events and all other outdoor recreational activities which require good weather.

Another object of the present invention is to provide desirable weather for businesses now effected during adverse weather periods.

A further object of the present invention is to provide sunshine for areas where overcast sky cover conditions slow down the growth of vegetation particularly in those areas which have a comparatively short growing period.

A further object of this invention is the creation of a quasi frontolysis and quasi cyclosis and quasi anticyclogenesis.

A further enumeration of the specific objects of this invention is deemed unnecessary as it will be obvious to those skilled in the art that the flexibility of these processes in this application to weather control generally is limited only by the number of different types of weather conditions.

In order that there be a complete understanding of the present invention it will be necessary to explain the causes of certain weather phenomena and the effect of the practice of the processes in the instant invention on those weather phenomena.

Meteorologically speaking a cloud is the formation of a body of moisture particles that has been lifted adiabatically until they have reached the dew point of the body of air in which they are found. The particle size of the water vapor develops upon condensation to the point where they become visible to the eye and yet their particle size is not sufficiently great so as to effect their stability in the atmosphere by causing them to feel the effects of gravity pulling them out of suspension. This latter effect would cause them to fall in the nature of precipitation out of the atmosphere and onto the earth below. A parcel of air at the surface containing a given moisture content and at a given relative humidity less than 100% will when subjected to surface heating cause the parcel of air to rise, dry adiabatically until it reaches the saturation point. At this point the moisture particles become visible to the eye and form what is commonly known as a cloud. The continuous surface heating causes this cloud to continue to develop in substantial proportions depending first on the additional amount of surface heating that is given to the air mass generally and depending on the moisture content and the stability of the upper air layers. Pressure decreases with increased elevation according to a fixed rate. This is a variable factor but the decrease is continuous. Temperature on the other hand generally decreases with increased elevation according to a variable adiabatic lapse rate. The lapse rate in a stable layer of dry air is approximately 10° C. per kilometer. (This is called the dry adiabatic lapse rate.) If the air is not saturated at any point within this first kilometer of air measured from the ground upward, that layer of the air within that parcel will be considered to be relatively stable. A decrease in temperature exceeding 10° C. per kilometer in the dry state, by that I mean short of complete saturation at any point within a given layer, would prove the existence of an unstable condition in the upper air structure. Thus it appears that if the decrease in temperature with increased elevation is less than 10° C. per kilometer and if the air mass were comparatively dry throughout that layer of air, then that layer of air would be comparitively more stable. When the moisture content in a given air mass has reached the saturation point, the decline in temperature with increased elevation assumes a different proportion. It now follows what is commonly referred to as the moist adiabatic lapse rate which is approximately one-half the dry adiabatic lapse rate. Specifically, this is approximately 5° C. per kilometer. The moist adiabatic lapse rate which showed a decline of greater than 5° C. per kilometer in the moist state would prove to be an unstable layer of air whereas a moist adiabatic lapse rate which was less than 5° C. per kilometer would prove to be a more stable layer of air. These upper air temperature declines will serve to give us an insight as to the approximate stability of the upper air structure and will indicate to us when clouds will tend to form and when clouds will tend to dissipate. This change in the decline in temperature with increased elevation from 10° C. per kilometer in the unsaturated state to approximately 5° C. per kilometer in the moist state is occasioned by the heat given off by the condensation of moisture particles which on cooling will yield approximately 600 calories of heat for each gram of water condensed out. This latent heat of condensation is absorbed by the air. A specific example would serve to indicate what would happen to a parcel of air, let us say taken at the surface where the surface pressure was 1000 millibars of pressure and a temperature of 20° C. surface temperature and a moisture content of 10 grams per kilogram of water. Since the saturation mixing ratio at the surface under these conditions of temperature and pressure is approximately 15 grams per kilogram, it can be readily seen that the relative humidity at the surface is approximately 66%. If this parcel of air were to be lifted dry adiabatically until it reached the saturation point it would be lifted to approximately 910 millibars of pressure, and to a temperature of about 12° C. at which point the relative humidity would reach 100% and clouds would form at that point. That height above the surface of the ground would be approximately 800 meters or roughly, about 2500 feet. That would be the cloud base and continuous heating beyond that would develop the cloud into whatever proportions the stability or unstability of the upper air structure beyond the 2500 feet level would permit. If the upper air structure were one of stability then the development of clouds and cloud formation would be limited. However, on the other hand, if the upper air structure were one of instability then the upper air structure would be such as to cause formation of well developed cumulus clouds developing possibly into thunderstorm clouds, commonly referred to as cumulonimbus. When these thunderstorm clouds develop they are oftentimes a threat to safe flying conditions and are further a threat to crops and other properties because of the possibility of falling hail which sometimes develops in thunderstorms.

The present invention proposes to utilize a process in which this type of cloud can be dissipated and completely dissolved before it has had the opportunity to complete its violent activity and after having been removed it will increase the amount of safety with which flights can be made. It will also reduce the amount of damage that will be done by such a storm, either through the execssively high winds that precede or accompany such a storm and further serve to reduce the amount of rain and hail that will fall therefrom.

It has often been said that one man's cloud is another man's fog. To the observer down in a valley looking up on a mountainside and observing a cloud formation, an observer might say "Look at that cloud development resting on that mountain top." The observer who is up on the mountain top will report "This is fog." Fog basically is nothing more than a cloud on the ground. There are a great many different types of fogs that do not vary greatly in their actual characteristics but rather in their method of formation. To name a few, there are—frontal fogs, air mass fogs of the advective type, the radiation or ground fog type, the sea fog type and up-slope fogs. All of these fogs create some of the most serious hazards to aerial flight in so far as they create hazardous take-off and landing conditions which have caused innumerable accidents in the past. The present invention will serve to dissipate a great number of these fogs and will increase the safety element of flight particularly from the standpoint of take-off and landing.

By the practice of the process in the instant invention, it will be possible to accomplish the quasi-frontolysis of certain types of frontal conditions. For instance, if a front moves down into a given barrier and finds itself locked between two different circulation systems it becomes what is commonly referred to as a quasi-stationary front. This frontal development generally does not cause any great amount of precipitation but it does cause cloud formation which will stand in a compartively fixed position and cut off a considerable area from the effects of sunshine over a long period of time.

By the use of the process herein to be described, such cloud formation in a quasi-stationary front can be completely dissipated in a very economical manner and cause sunshine again to break through without waiting for this quasi-stationary frontal system to dissipate by the eventual loss of its own energy.

Still further, frontal systems that are more active, such as the warm front, the cold front, the occluded front and its two submembers, the warm front occlusion and the cold front occlusion, can be dissipated or at least reduced in force by the application of the process of the instant invention.

Still further, it would be possible to induce anti-cyclogenesis, by that I mean the generation of an anticyclone or high pressure cell, and by so doing create better weather conditions. It often occurs that a low pressure cell at the surface extends aloft and is so locked in its circulation that it has little or no tendency to move to other areas, this results in poor weather conditions for a given area over an extended period of time. By practice of the present invention, the low pressure cells can be dissipated somewhat by induced subsidence caused by the practice of this process which gives a simulated cyclosis which is the disintegration of the cyclone or low pressure cell.

In the practice of the process of my invention, I make use of any of the following substances, manufactured flake ice, natural flake ice, manufactured snow and natural snow. These can be used collectively or individually. These can also be used with such condensation nuclei as salts, e. g., sodium chloride, potassium iodide, and calcium chloride. I could also use for condensation nuclei, cement in the powdered form and micronized carbon particles. It must be remembered that the former group of ingredients, namely, flake ice, etc., do not necessarily have to be used with these condensation nuclei as tests prove that the process is quite as effective in certain instances when the manufactured flaked ice and the like are used without the condensation nuclei. However, instances will arise in which it would be more advantageous to use the flake ice together with condensation nuclei to perform a particular operation, whereas in other operations it may be advisable to use the flake ice alone depending upon the result desired. The use of flaked ice, either natural flaked ice or the manufactured flake ice stands out as completely different in result and effect from the result accomplished by use of Dry Ice because the Dry Ice being solid carbon dioxide and having very low melting and boiling points will undergo the transition from a solid state to the gaseous state without actually becoming a liquid. Because of its very low boiling point Dry Ice will cool a mass of air considerably more in a given layer and to a greater extent than will the flake ice used in my invention. Furthermore, Dry Ice does not add any moisture to the air at all because it contains no moisture. The flake ice, of course, will melt at the 0° C. and above and the result is that a slower melting takes place with the flake ice becoming first cold water and eventually dissolving in the air as water vapor. These flake ice particles in their downward descent in the wake of an airship will flutter much in the same manner as falling leaves and will slowly give off their moisture and will slowly absorb heat from the air, thus, not upsetting the comparative stability of the air and not tending to cause violent weather activity. The injection of Dry Ice into a cloud cools off a fixed layer in a matter of minutes and upsets the equilibrium of the upper air structure to such a point that the forces of nature in its efforts to maintain equilibrium will cause a down draft of the colder air above and updraft of the warmer air below that great convective clouds develop. Tremendous rains and hail can develop from an artificially created upper air unstable condition. The gradual cooling that is accomplished by the injection of the flake ice into a given air mass upsets the equilibrium of the air but does not so upset that equilibrium as to induce violent convective activity so commonly experienced in the cumulonimbus type of a cloud. Another effect that this flake ice has on stability and cloud structure is, as the flakes begin their downward descent and they begin to cool the layers of air successively as they fall from top downwardly toward the earth, moisture developing from the melting flake ice will disperse itself into the cloud proper creating water droplets which will collide with water droplets already existing within the clouds and cause them to increase in size by coalition. Such increase being sufficient to cause them to feel the effects of gravity in its downward pull toward the earth and will cause these water droplets to begin to fall. As these moisture particles start their downward fall they will pass through layers of air below the cloud level where the air is not saturated and will cause the water droplets to begin to disperse and to increase the moisture content of the lower levels and ultimately will result in complete dissipation of the cloud structure. Specific examples of my experiments will tend to further illustrate the factors which I have already outlined.

Example 1 was an experiment which I formed on a cumulo-type cloud which had a base approximately at 2500 feet and a top between 6 and 7 thousand feet. The surface temperature was about 80° F. and I injected into that cloud some condensation nuclei in the nature of sodium chloride and on returning to see the effect of this condensation nuclei on the cloud I found that it had pancaked the cloud down to the point where it was only about 200 feet-deep but still had its cloud base at 2500 feet and a cloud top at 2700 feet and was more in the nature of stratocumulus cloud. No rain was developed from this cloud.

My second experiment was performed on a bank of clouds which amounted to a complete overcast with breaks. The cloud bank itself was about 2500 feet at the base, about 1000 feet thick with a cloud top at 3500 feet. I flew through the cloud structure at about the top level and dispersed therein a quantity of flake ice alone. I found that I cut a virtual path through the cloud and dissipated a complete area of clouds and actually produced no rain. The surface temperature at the time of the experiment was about 82° F. and I noticed that those clouds, which were not immediately effected by the flake ice, but which were adjacent to the ones which were effected, were caused to be drawn in as though pulled into a down-draft and ultimately dissipated.

My third experiment was performed on a cumulonimbus cloud with a fairly well developed anvil top. The cloud base was at approximately 2500 feet. The surface temperature was about 80° F. The anvil top began at about freezing level, 12,000 feet, and extended beyond to the top of the anvil at 15,000 feet. I flew around the outer periphery of the cloud and dispersed therein flaked ice, about 1 pound injection at a time, and I flew at approximately 12,000 feet which was at the freezing level, and I dispersed this flaked ice about three-fourths of the way around the cloud. Almost immediately the lower part of the cloud suddenly turned black and boiled considerably toward the bottom. Shortly thereafter heavy continuous rain began to fall out of the cloud. The surface temperature at the time of the experiment was approximately 80° F. No hail developed from the cloud but in a matter of a few minutes the cloud began to disintegrate and finally dissipated completely. In this process a smaller cumulo congestus type cloud was noticed to be pulled in to that area which was once occupied by the cumulonimbus cloud and this smaller cumulo-form cloud finally dissipated.

My fourth experiment was performed on a bank of clouds which had developed on the windward side of a mountain top and which extended about 500 feet above the side of the mountain in a continuous layer extending about 1500 feet upwardly making a cloud top at about 3500 feet to 4000 feet. I dropped a quantity of flaked ice into the center portion of this cloud bank extending around the mountain rim. On retracing the path of flight, I found that the cloud had dissipated except for a few fragmentary parts which dissipated completely after a few additional minutes. No rain was seen to fall from this cloud in its dissipation.

In the treatment of fogs by my method, it has been found that the dropping of the flake ice in the relatively thin layer of fog, which is actually a cloud on the ground, that the cooling caused by the ice itself together with the moisture particles added by the ice in an impact with moisture particles existing in the fog, that sufficiently large particles would develop to the point where they would, by force of gravity, drop out of the fog to the earth below. Since fog does not have a drier layer of air beneath its base in which to drop and dissipate, the moisture particles visible in the fog layer would drop out as rain. Dispersal of the fog layer could be accomplished by the pattern method of dropping the flake ice. This would cause sufficiently dissipated water vapor areas, for the solar radiation to reach the earth's surface causing solar heating of the surface and inducing the convective currents to begin, ultimately resulting in a complete dissipation of the fog bank. It is conceivably possible to perform this process from an aircraft of any type or by the use of a projector of an explosive type which would disperse the flake ice into a given cloud at a predetermined altitude, or by the use of such other devices as bombs, or balloons with an exploding unit contained therein to distribute the flake ice at a predetermined altitude within the given cloud.

Fogs, which are due to a temperature inversion near the surface resulting from nocturnal radiation, would present an upper air structure of complete stability in its lower layers because the adiabatic lapse rate would indicate an increase in temperature with increased elevation. This is due to the cooler air settling to the earth because of its greater density. The injection of flake ice into such a layer of fog would not cause convective activity but would reduce the stability of that layer of air at the surface. The most effective feature in this operation would be in providing collisions between the suspended moisture droplets so as to form larger water droplets, ultimately causing them to become sufficiently heavy so as to drop out of suspension in the gaseous mixture, namely, the atmospheric air. These temperature inversions, although formed at night, continue to persist generally in the early morning and sometimes into a considerable portion of the day, particularly when the fog layer is so thick that the solar radiation cannot penetrate the fog layer. In such an instance, the solar radiation cannot reach the ground in its full effect. Surface heating is, as a consequence, almost negligible. By the injection of flake ice into such a fog bank, the moisture droplets will be caused to condense out and to fall. The result is that the solar radiation in the early part of the day will be able to cut through and cause some surface heating which will accelerate the dissipation of the fog. It can be readily seen that the clearing of areas where aircraft take-offs and landings are to be accomplished within a matter of minutes with an inexpensive ingredient such as flake ice, would increase air traffic considerably and would facilitate landing and take-off operations to the point where the element of hazard is at least reduced if not completely eliminated. The utilization of such a process would eliminate one of the most hazardous of all flying weather conditions. The injection of the flake ice in such a fog should be accomplished just above the top layer of the fog bank. This is equally true in the instance of dissipating clouds generally, as the flaked ice will have it fullest effect when it is injected into the uppermost layers of the cloud formation.

It is obvious to those skilled in the art that the use of this process is not limited to the dispersion of atmospheric clouds and fog alone but could readily be utilized to disperse other types of cloud formation, such as dust clouds, smoke clouds and the like, since the action of the flake ice on the smoke and dust particles will only help to accelerate the dispersion thereof.

In the practice of the process in this invention the type of clouds which can be dissipated by injecting the flake ice are not limited to low clouds but can be extended so as to include middle and high clouds. In the low clouds, I refer specifically to cumulo form clouds such as the cumulonimbus and other cumulo form clouds. I also can direct this process to the dissipation of stratus and stratocumulus type clouds.

In the middle class of clouds all types can be dissipated but more specifically, I refer to the altocumulus and the altostratus.

In the high clouds, I refer specifically to cirrocumulus and cirrostratus.

Frontal weather systems are divided into three principal groups. The warm front which is best described as being the divisional line between two distinguishable air masses in which the warmer air behind the front is pushing up over the colder air in advance of the front. In the cold front the distinguishing features are that the air in advance of the front is riding up and over the mass of cold air behind the front. The occluded front which has two sub-members, the cold front occlusion and the warm front occlusion, occur in weather when the warm front portion of an unstable wave is reached by the faster moving cold front portion of the same unstable wave, so that the two fronts are united to form a single but complex frontal picture. If the cold air in advance of the warm front is actually colder than the cold air behind the cold front then the mass of air behind the cold front will ride up and over the cold air in advance of the warm front and it will become a warm front occlusion. On the other hand, if the air in advance of the warm front is not as cold as the cold air behind the cold front then the cool air in advance of the warm front will ride up and over the colder air behind the cold front and will form what is referred to as the cold front occlusion. In both instances the warmer air in the warm sector will push up over both the cooler air masses in advance of the warm front and behind the cold front.

The amount of flake ice which may be dispersed within a given atmospheric system depends on the size of air mass to be affected. This may be anything from a single well-developed cumulo type cloud to an extensive frontal system and the amounts vary accordingly.

Although most of the discussion in the detailed explanation of this invention has been directed to improving weather when poorer conditions exist it is possible to deteriorate weather conditions by the practice of this invention. If good weather conditions existed and it were desired to have cooler or cloudier weather by the practice of the process of this invention cloud forms could be developed so that some measure of sunshine and solar radiation would be cut off. This could be accomplished by injecting a sufficient amount of flake ice into the upper atmosphere. This would increase the relative humidity in the upper layers to the point where cloud formations, due to convective activity established by the change in the stability in the upper air, would cause overcast or cloudy conditions.

By flake ice I mean water in the solid state which has the physical attributes of a flat wafer-like particle enjoying a substantial maximum flat surface area and a substantial minimum cross-sectional area as opposed to ice-crystals, hail, ice pellets, ice cubes and the like which fail to settle gradually in their downward descent in the manner in which these flake ice particles settle. Flake ice is sometimes referred to as flak ice.

I claim:

1. A process for altering weather conditions in the unconfined, non-vacuous atmosphere which comprises dispersing therein flake ice at an elevation such that said flake ice settles in at least a partially horizontal direction and a substantial maximum surface area per volume of said flake ice contacts a maximum volume of said atmosphere per volume of said flake ice and such that said flake ice in its gradual downward descent contributes its moisture content to said atmosphere and changes the stability structure and moisture content of said atmosphere.

2. The process set forth in claim 1 wherein said atmosphere is in a weather frontal system.

3. The process set forth in claim 1 wherein said atmosphere is in an anticyclone.

4. The process set forth in claim 1 wherein said atmosphere is in a cyclone.

5. A process for dissipating clouds which comprises dispersing therein flake ice at an elevation such that said flake ice settles in at least a partially horizontal direction and a substantial maximum surface area per volume of said flake ice contacts a maximum volume of said clouds per volume of said flake ice and such that said flake ice in its gradual downward descent contributes its moisture content to said atmosphere and changes the stability structure and moisture content of said clouds.

6. A process for dissipating fog which comprises dispersing therein flake ice at an elevation such that said flake ice settles in at least a partially horizontal direction and a substantial maximum surface area per volume of said flake ice contacts a maximum volume of said fog per volume of said flake ice and such that said flake ice in its gradual downward descent contributes its moisture content to said atmosphere and changes the stability structure and moisture content of said fog.

HARVEY M. BRANDAU.

REFERENCES CITED

The following references are of record in the file of this patent:

UNITED STATES PATENTS

| Number | Name | Date |
| --- | --- | --- |
| 462,795 | Gathmann | Nov. 10, 1891 |